United States Patent [19]

Krasznai et al.

[11] Patent Number: 5,402,708
[45] Date of Patent: Apr. 4, 1995

[54] CONTROL FOR A TOASTER FOR VARYING THE DURATION OF THE TOASTING CYCLE

[75] Inventors: Charles Z. Krasznai, Fairfield; Leonard Horey; Duc Tran, both of Shelton, all of Conn.

[73] Assignee: Black & Decker Inc., Newark, Del.

[21] Appl. No.: 178,993

[22] Filed: Jan. 7, 1994

[51] Int. Cl.6 ............................................. H05B 1/02
[52] U.S. Cl. .................................. 99/328; 99/329 R; 99/385; 219/501; 219/494; 219/497
[58] Field of Search ........................ 99/326, 334, 329 R, 99/329 P, 329 RT, 328, 333, 385, 389; 219/501, 497, 505, 494, 492, 507, 490

[56] References Cited

U.S. PATENT DOCUMENTS

| | | | |
|---|---|---|---|
| 2,431,195 | 11/1947 | Olving | 99/327 |
| 2,451,508 | 10/1948 | Olving | 219/19 |
| 2,541,436 | 2/1951 | Olving | 219/19 |
| 2,560,386 | 7/1951 | Gomersall | 99/328 |
| 2,560,388 | 7/1951 | Olving | 99/328 |
| 2,631,524 | 3/1953 | Theisen | 99/333 |
| 3,785,079 | 1/1974 | Rohn | 242/84.5 R |
| 3,794,808 | 2/1974 | Takagi | 219/497 |
| 4,296,312 | 10/1981 | Salem | 99/329 R |
| 4,359,702 | 11/1982 | Schantz | 335/2 |
| 4,395,621 | 7/1983 | Parker | 219/492 |
| 4,645,909 | 2/1987 | Thoben et al. | 219/411 |
| 4,742,246 | 5/1988 | Mori | 307/141.4 |
| 4,755,656 | 7/1988 | Charlesworth et al. | 99/329 P |
| 4,976,194 | 12/1990 | Kelterborn et al. | 99/328 |
| 5,094,154 | 3/1992 | Nopanen | 99/328 |
| 5,294,050 | 3/1994 | Hoffman et al. | 237/2 A |

Primary Examiner—David A. Scherbel
Assistant Examiner—Reginald L. Alexander
Attorney, Agent, or Firm—Barry E. Deutsch

[57] ABSTRACT

A control for a toaster for varying the toasting cycle includes a switch for connecting the toaster heater to a source of electrical power. A temperature responsive resistance element senses the temperature within the cavity. A capacitor is responsive to the magnitude of the voltage of the electrical power. The capacitor and the temperature responsive resistance element are included within a timing circuit such that a selected duration of time for a toasting cycle to obtain a desired toast color is varied if the voltage of the power supply increases above a predetermined magnitude during the toasting cycle. The duration of time for the toasting cycle is also varied as the temperature in the cavity increases as a consequence of operation of the toaster for consecutive toast cycles.

17 Claims, 3 Drawing Sheets

CONTROL FOR A TOASTER FOR VARYING THE DURATION OF THE TOASTING CYCLE

BACKGROUND OF THE INVENTION

This invention relates to a control for an electric toaster for obtaining a desired toast color and in particular to a control which will vary the length of the toasting cycle in accord with variations in the voltage supply to the toaster during the toast cycle or in accord with temperature increases in the cavity as a consequence of operation of the toaster for consecutive toast cycles.

A control for obtaining a desired color of toast in toasters often comprises a simple timer or counter. Such control utilizes a resistor-capacitor (RC) oscillator to determine the basic timing of the control and have the advantage of being relatively low in cost. Further, the user may readily regulate the control to obtain a desired toast color by varying the resistive portion of the RC oscillator.

To provide temperature compensation (shorter toasting cycle times as a result of the toaster cavity being warm as a consequence of the operation of the toaster for consecutive toast cycles), the control may include either a resistor or capacitor whose resistance or capacitance respectively will vary with temperature as part of the RC oscillator. In this manner, as the temperature within the toast cavity increases, the length of time for the toasting cycle will decrease to obtain a given color of toast. The temperature within the toasting cavity may be measured directly; however, there are other techniques which may equally be employed.

It has been found that placing the temperature sensing components directly in the toasting cavity reduces the operating life of the component. On the other hand, by placing the sensor outside the cavity, the changes in the electrical characteristic of the sensor is only proportional to the actual cavity temperature and may not provide a control having the desired sensitivity and accuracy.

If a dropping resistor is used as part of the power supply for the control, the heat generated by the dropping resistor will increase while the control is on. This resistor may then be employed to heat a component instead of actually measuring the temperature within the toasting cavity. This technique has the advantage of not requiring an external sensor in the toasting cavity; however, it may not provide a good model of the toasting cavity's temperature at all times.

To produce a consistent toast color, one should provide voltage compensation in addition to temperature compensation. This is necessary because the heat generated by the toaster heaters is proportional to the square of the supply voltage and the supply voltage may vary, for example between 112 and 128 volts. While the temperature varying component used to provide temperature compensation may also provide some voltage compensation, the amount of voltage compensation obtained is usually insufficient for effective operation of the control. This problem occurs because temperature compensation requires that the temperature sensor be heated at the same rate as the temperature rises within the toasting cavity, while voltage compensation requires the sensor to be rapidly heated to a value proportional to the supply voltage. Accordingly, one sensor cannot adequately provide both types of compensation.

It has been found that an electronic resistance element, such as a negative temperature coefficient thermistor, can be effectively used to monitor the temperature of the toasting cavity for temperature compensation purposes. It has been further found that the location of the thermistor relative to the cavity in horizontally disposed toasters is extremely important for effective operation. It has also been determined that the size of the opening communicating the thermistor with the toasting cavity is important to enable the thermistor to accurately sense the temperature within the cavity. Finally, it has been found that using the combination of a temperature sensitive capacitor and resistor increases the accuracy of the control in sensing the actual temperature in the cavity.

Accordingly, it is an object of this invention to provide temperature in a toasting control without significantly increasing the circuit complexity and cost. It is a further object of the invention to provide a control having temperature and voltage compensation which is effective in operation due to the manner in which the temperature sensing portion of the control is mounted on the toaster.

SUMMARY OF THE INVENTION

The foregoing objects and other objects of the invention are attained in a control for a toaster for varying the period of time of the toasting cycle wherein the toaster includes heating means mounted in a toasting cavity defined by the toaster housing. The control includes means for selecting a duration of time for the toasting cycle to obtain a desired toast color. Means connects the heating means to a source of electrical power. Temperature responsive resistance means senses the temperature within the toasting cavity. The control includes timing means for automatically varying the selected time duration of the toasting cycle including switch means for disconnecting the heating means from the source of electrical power at the completion of the toasting cycle. Capacitor means is electrically connected to the source of electrical power and in a first embodiment is responsive to the magnitude of the supply voltage from the source of power such that the capacitance of the capacitor means decreases as the magnitude of the supply voltage increases. In a second embodiment the capacitor means may be responsive to the temperature within the toasting cavity such that the capacitance decreases as the sensed temperature increases. The timing means includes the capacitor means and temperature responsive resistance means. The timing means reduces the selected duration of time of the toasting cycle as the magnitude of the voltage exceeds a predetermined level during the toasting cycle and reduces the selected duration of the toasting cycle as the temperature in the cavity increases as a consequence of operation of the toaster for consecutive toast cycles.

The invention further includes a method for varying the duration of time of the toasting cycle of an electric toaster comprising the steps of establishing an initial toast cycle duration for obtaining a desired toast color; monitoring the temperature within the toasting cavity to reduce the duration of the established toast cycle as the temperature in the cavity increases as a consequence of operation of the toaster for consecutive toast cycles; and monitoring the magnitude of the voltage supply to the electric toaster to reduce the duration of the established cycle as the magnitude of the voltage exceeds a predetermined level during a toasting cycle.

DESCRIPTION OF THE PREFERRED EMBODIMENTS

Figure 1:
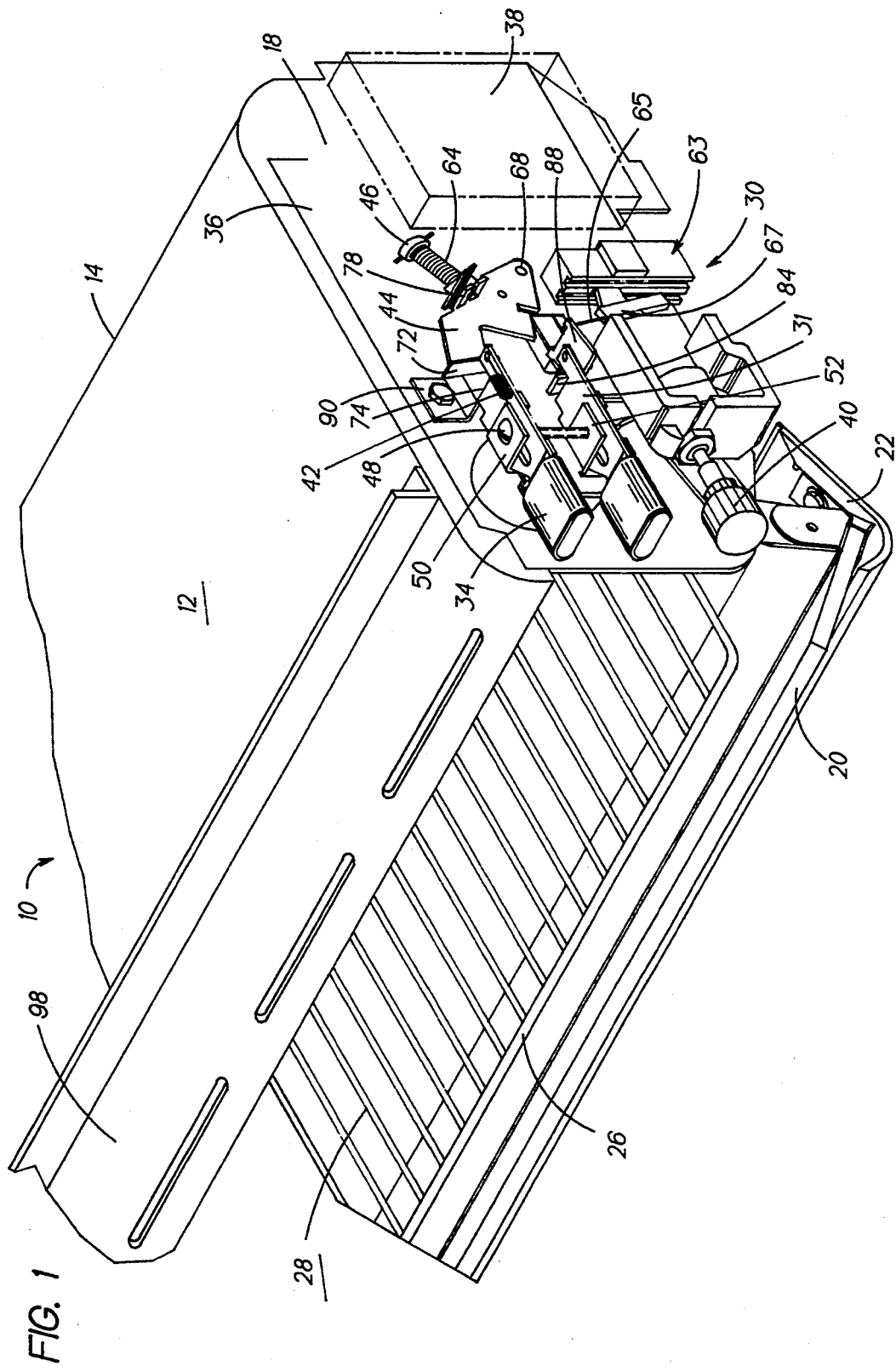
FIG. 1 is a perspective view of a portion of a toaster including the control of the present invention.

Referring now to the drawing, there is disclosed preferred embodiments of the present invention. In referring to the various figures of the drawing, like numerals shall refer to like parts.

Referring specifically to FIG. 1, there is disclosed a toaster 10 including a top wall 12, a rear wall 14, bottom wall 16, side walls 18 (only one of which is shown) and a front wall or door 20. Front wall 20 is made from either translucent or transparent material and is mounted on a pivotable support frame 22. Frame 22 pivots about a pivot pin (not shown). Glass front wall or door 20 pivots downwardly with respect to top wall 12 to provide access to the interior thereof for either loading or unloading the toasting chamber.

As shown in FIG. 1, toaster 10 includes a food support rack 26 which is positioned within toasting cavity 28. Rack 26 is movable in a horizontal plane within the toasting cavity so that when door 20 opens, the front of rack 26 extends forwardly of the front face 98 of the toaster. The control for moving the support rack 26 forwardly and opening door 20 at the conclusion of the toasting cycle is described in greater detail in co-pending patent application Ser. No. 08/179,026 Filing Date Jan. 7, 1994 in the names of Robert St. John, Richard Kosten and Charles Z. Krasznai and assigned to the same assignee as the assignee hereof.

The control 30 for toaster 10 includes a start switch 32 and a toasting cycle off/door open switch 34. The control further includes a toast color selector switch 40 which may be adjusted by the user to obtain a desired toast color. Control 40 may be a potentiometer or other suitable variable resistor. The duration of the toasting cycle is regulated in part through adjustment of control 40.

Switches 32, 34 and 40 are mounted on a front face 36A of support frame 36. Frame 36 is, in turn, connected to side wall 18 via such means as bracket 90. Switch 32 includes an axially extending plate 31 having an axially extending slot 33 formed therein. Plate 31 terminates in a striking face 39. Likewise switch 34 includes an axially extending plate 41 having an axial slot 35 formed therein. Plate 41 terminates in a striking face 37.

Control 30 further includes a solenoid switch 46 having a coil 64 and a plunger 70. Solenoid 46 is also mounted on support frame 36.

The control also includes a main power switch 48 which includes a trigger 65, an actuator 67, and a non-conductive housing 63. Switch 48 is also mounted on support frame 36.

Switch 48 and solenoid 46 are electrically connected to a printed circuit board 38 which is also supported on frame 36. Printed circuit board 38 is also connected to toast color control 40 and to a source of electrical power.

Switch 48 is closed in response to the user moving switch 32 to its on position. When it is so moved by switch 32, the various components of control 30 are connected to the source of electrical power as is the toaster heaters (not shown). When switch 32 is subsequently reopened, the various electrical components of toaster control 30 and the heater are disconnected from the source of power.

Figure 2:
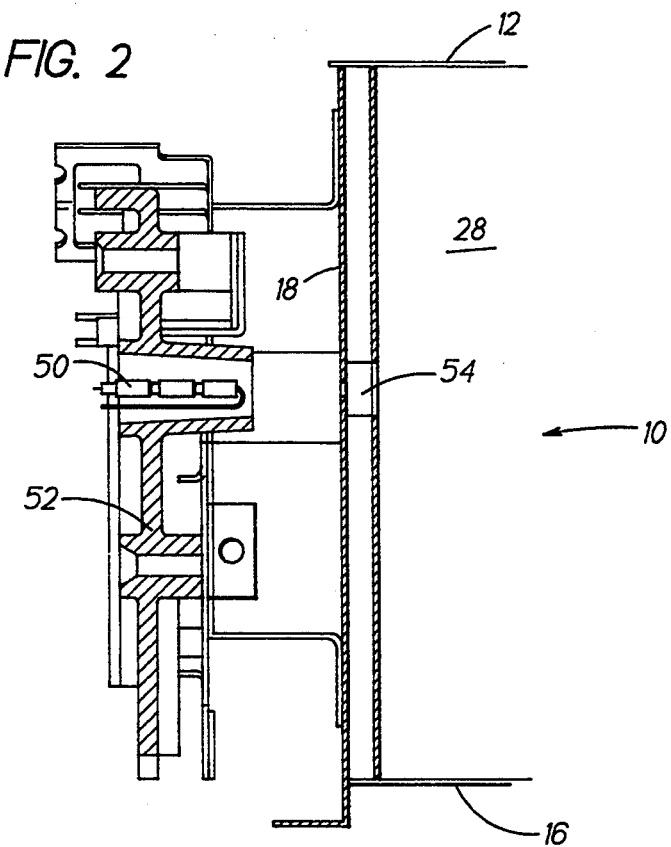
FIG. 2 is a sectional elevational view of a portion of the control of the invention supported on a toaster.

It has been found that it is desirable to sense the temperature of the toaster cavity to achieve the desired toast color as established by the user through control 40. A thermistor, such as a negative temperature coefficient thermistor 50 shown in FIG. 2, may be effectively employed to sense the temperature of the cavity and to provide a signal of varying magnitude dependent on the sensed temperature. Thermistor 50 is mounted in a high temperature resistent, electrically non-conductive housing 52. Housing 52 may be formed from a plastic such as a general purpose high temperature phenolic. The housing extends from the rear face 36B of frame 36 and is supported thereon.

Thermistor 50 is aligned with circular opening 54 formed in the rear upper portion of the right side wall 18 of toaster 10 when viewed from the front of the toaster. For accurate sensing of the temperature within the cavity and accurate performance of thermistor 50 in sensing such temperature, the diameter of opening 54 should be at least 3/16 of an inch. Further the maximum space between thermistor 50 and side wall 18 is 11 mm.

Figure 3:
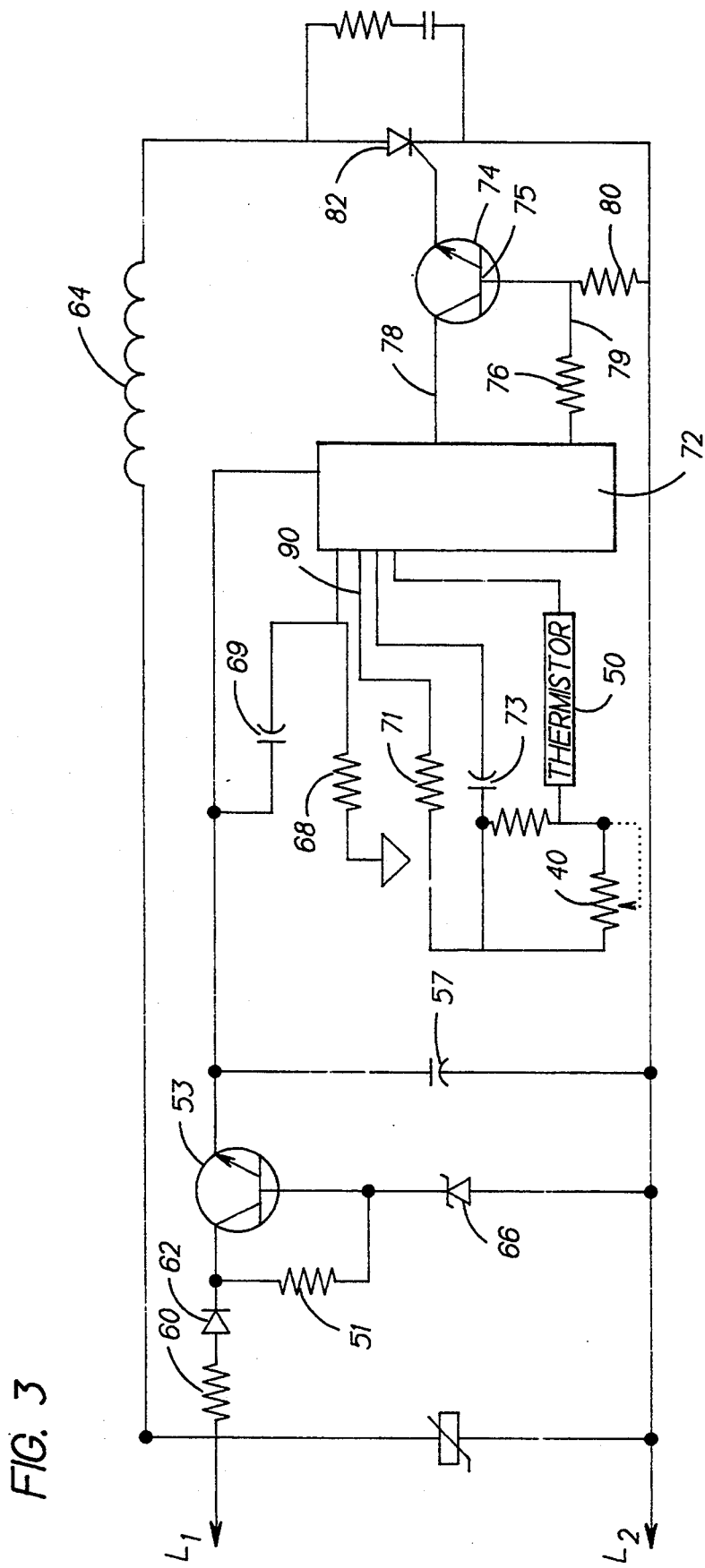
FIG. 3 schematically represents a first embodiment of a portion of the control.

In a first embodiment, main power switch 48, toast color selector switch 40, solenoid coil 64, and printed circuit board 38 are electrically connected as schematically shown in FIG. 3. The electrical components of toaster 10 are connected to a source of electrical power represented by Lines L1 and L2 which provides a standard 120 volt, 60 Hertz current to the toaster. The control includes a dropping resistor 60 which decreases the 120 volt supply voltage to 12 volts for use in the control.

A diode 62 is used to provide half wave rectification of the current. A resistor 51, transistor 53 and zener diode 66 are included in the circuit to provide approximately an 11.2 voltage output signal. Zener diode 66 compensates for supply voltage fluctuations to provide a stable 11.2 voltage control signal. A capacitor 57 provides a current to the remaining components of control 30 during each transition of the supply voltage.

Control 30 further includes a capacitor 69 and a resistor 68 which provide a reset control signal to integrated circuit 72. Integrated circuit 72 is a 14 stage ripple carry binary counter Model CD4060BE made by National Semiconductor.

Control 30 further includes an oscillator circuit which provides a control signal whose period will vary in accordance with the magnitude of the sensed temperature within cavity 28. The oscillator portion of the circuit includes thermistor 50 and toast color control 40. Control 40 is preferably a potentiometer or other type of variable resistor. The oscillator portion of the control also includes a resistor 71 and a capacitor 73. Capacitor 73 is preferably temperature sensitive such as a Y5V or Z5U ceramic capacitor sold by Philips Components of El Paso, Tex. Thermistor 50, resistor 71 and capacitor 73 help to provide timing signals into integrated circuit 72. These timing signals provide an output signal through conductors 78 and 79. The availability of the output signal to be transmitted through conductors 78 and 79 is dependent upon the sensed temperature within the cavity of the toaster.

The output signal transmitted via conductor 79 is furnished to a base 75 of transistor 74 via resistors 76 and 80. Transistor 74 is a switching transistor.

When transistor 74 is turned on, it will fire SCR 82 which, in turn, will energize coil 64 of solenoid 46. When solenoid 46 is energized, it will result in switch 48 being opened to electrically disconnect the toaster from the source of power. The manner by which switch 48 is opened when coil 64 is energized is more fully explained in the previously cited U.S. patent application filed in the names of Robert St. John, Charles Z. Krasznai and Richard B. Kosten. Suffice for the purposes of this application, energization of coil 64 will cause plunger 70 to retract to rotate arm 44 in a clockwise direction.

In operation of the embodiment of FIG. 3, the user of toaster 10 initially establishes the operating temperature for the toaster by adjusting control 40 to obtain a desired toast color. If the voltage supply is at its normal 120 volt level, then the duration of the toasting cycle will be as determined by the setting for control 40; that is to say if a darker color toast is desired, the duration of the toasting cycle will be relatively long and if the desired toast color is relatively light, then the duration of the toast cycle will be relatively short. Control 40, resistor 71 and capacitor 73 establish the timing circuit which will provide a periodic input signal to integrated circuit 72. Circuit 72 counts the input signals and when it reaches a proper count, circuit 72 in turn provides an output signal through conductors 78 and 79 to turn on transistor 74 which, in turn fires SCR 82 to energize winding 64 of solenoid 46. This results in the completion of the toasting cycle.

In the event the user of toaster 10 desires to immediately start one or more additional toasting cycles, the retained heat within the toasting cavity 28 increases the available heat to toast the comestible within the toasting cavity. Accordingly, if the user does not adjust control 40, the toast color will be darker than that desired due to such retained heat.

Thermistor 50 senses the temperature within toasting cavity 28 and as the thermistor is a negative temperature coefficient thermistor its resistance decreases as the sensed temperature increases. The charging time for capacitor 73 is controlled by the combined resistance of resistors 40 and 50. The capacitor is constantly charging and discharging and the rate at which capacitor 73 charges and discharges determines the frequency of the control signal transmitted to circuit 72. As the resistance of thermistor 50 decreases as a result of a higher sensed temperature in the toasting compartment 28, the charge time for capacitor 71 decreases. The foregoing results in reducing the duration of time before a signal is transmitted via conductor 90 to integrated circuit 72 which, in turn, results in the duration of the toasting cycle being shorter than the previous cycle even though the user has not varied the setting of control 40. As the temperature within cavity 28 increases upon continued use from toasting cycle to toasting cycle, the resistance of thermistor 50 continues to fall to further shorten the duration of the toasting cycle.

In the embodiment illustrated in FIG. 3, the capacitance of capacitor 73 decreases as the temperature in cavity 28 increases and the capacitance increases as the sensed cavity temperature decreases. It has been found that since thermistor 50 is not located in toasting compartment 28, the change in the resistance of thermistor 50 while proportional to the change in temperature within cavity 28, does not in some instances provide as accurate or as sensitive a control as may be desired. Thus, it has been determined that the color of toast may vary from one toasting cycle to the next even though the user has not adjusted control 40.

Capacitor 73 is located on printed circuit board 38 such that it is affected by the heat retained within cavity 28. Thus as the temperature within cavity 28 increases, the capacitance of capacitor 73 will decrease.

As the capacitance of capacitor 73 decreases upon an increase in the temperature in cavity 28 and the resistance of thermistor 50 also decreases upon an increase in temperature within cavity 28, the duration of the toasting cycle will decrease as the temperature within toasting cavity 28 increases. By providing both temperature responsive resistance element 50 and temperature responsive capacitor element 73 to sense the temperature within cavity 28, the color of the toast delivered from toaster 10 will be consistently at the same level from toast cycle to toast cycle as long as the user does not change the setting of control 40.

Figure 4:
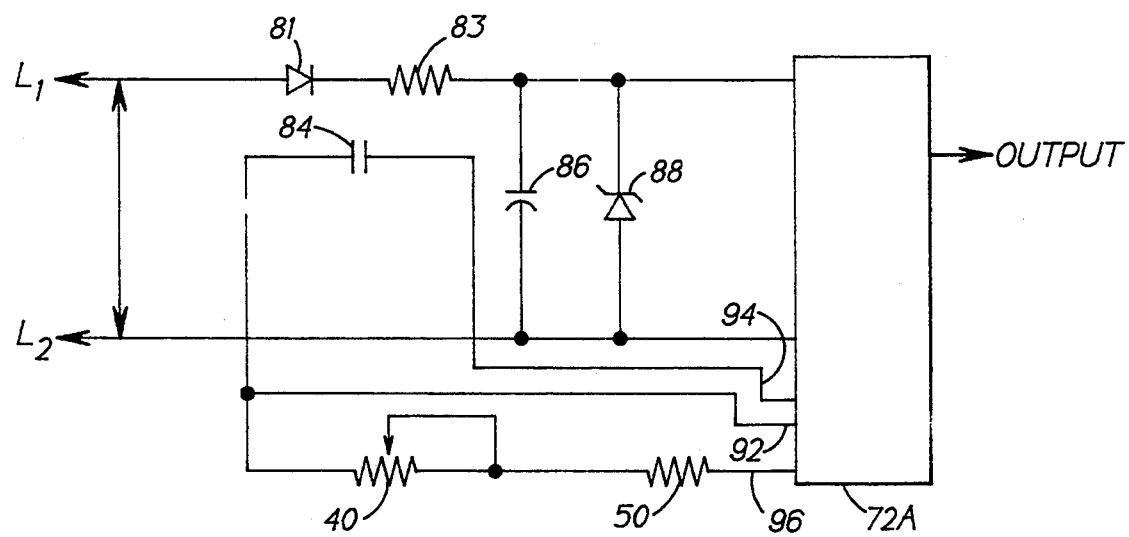
FIG. 4 schematically represents a second embodiment of a portion of the control.

Referring now to FIG. 4, there is disclosed an alternative embodiment of the present control.

The electrical components shown in FIG. 3 are connected to a source of electrical power represented by Lines L1 and L2. A diode 81 is used to provide half wave rectification of the current. The control includes a dropping resistor 83 which decreases the 120 volt supply voltage to 12 volts for use in the control. Resistor 83 is located in relatively close proximity to temperature sensitive capacitor 84. Capacitor 84 may also be a Y5V or Z5U ceramic capacitor. Zener diode 88 compensates for supply voltage fluctuations to provide a stable 11.2 voltage control signal. Capacitor 86 provides a current to the integrated circuit 72 when diode 81 is off. The control also includes a user operated toast color control variable resistor 40 and a thermistor 50 described with reference to the embodiment illustrated in FIG. 3. The output from capacitor 84 and the combination of thermistor 50 and control 40 form an oscillator output which provide an oscillator input control signal into integrated circuit 72 via conductors 94,92 and 96. The output from integrated circuit 72 is used to activate solenoid coil 64 in the same manner as previously described with reference to the first embodiment illustrated in FIG. 3 and therefore will not be described in detail.

Thermistor 50 and control 40 operate in the same manner that control 40 and thermistor 50 described in FIG. 3 operate to vary the frequency of the timing signal transmitted to integrated circuit 72.

Capacitor 84 as noted previously is temperature sensitive. Since it is located in relative close proximity to dropping resistor 83, the capacitance of capacitor 84 will be affected by the heat generated by resistor 83. The heat generated by resistor 83 will be proportional to line voltage, that is as line voltage increases, the heat generated by resistor 83 will likewise increase and as line voltage decreases, the heat generated by resistor 82 will likewise decrease.

If, during any toasting cycle line voltage increases above the nominal 120 volt rating, then the heat generated by resistor 83 will likewise increase. The capacitance of capacitor 84 will be immediately affected by the increased heat given off by resistor 83 so that the capacitance will decrease as line voltage increases. The decreased capacitance of capacitor 84 will result in a faster charging rate. This in turn will reduce the interval of time prior to a signal being transmitted through conductors 92 and 94 to integrated circuit 72 to cause an output signal to terminate the toasting cycle. In effect, the total toasting time will be proportional to the product of thermistor 50 (resistance) and capacitor 84 (capacitance).

Since the capacitance of capacitor 84 decreases upon an increase in line voltage and the resistance of thermistor 50 decreases upon increase in temperature, the duration of the toasting cycle in the embodiment illustrated in FIG. 4 will decrease if either line voltage increases or the temperature within toasting cavity increases. In effect, the duration of a given toasting cycle is proportional to the product of the two sensors, namely thermistor 50 and capacitor 84. Thermistor 50 compensates for increases of temperature within the toasting cavity 28 from cycle to cycle while capacitor 84 compensates for variations in line voltage during any specific toasting cycle. Such compensation provides the user with a desired toast color irrespective of fluctuations of the supply voltage or of changes of temperature within the toasting cavity.

Capacitor 84 may also be affected by the temperature within toasting cavity 28 in a manner that is similar to the effect of such temperature on capacitor 73. As described herein, the capacitance of capacitor 84 is affected by the heat given off by dropping resistor 82 and may also be affected by changes in temperature within cavity 28 as reflected by the heat given off from the cavity.

While a preferred embodiment of the present invention has been described and illustrated, the invention should not be limited thereto but may be otherwise embodied in the scope of the following claims.

What is claimed is:

1. A control for a toaster for varying the duration of a toasting cycle comprising:
   heating means mounted in a toasting cavity defined by a toaster housing;
   means for connecting the heating means to a source of electrical power;
   means for selecting a duration of time for the toasting cycle to obtain a desired toast color;
   temperature responsive resistance means for sensing the temperature within the toasting cavity;
   timing means for automatically varying the selected time duration of the toasting cycle including switch means for disconnecting the heating means from the source of electrical power at the completion of the toasting cycle; and
   temperature responsive capacitor means electrically connected to the source of electrical power and being thermally responsive to the magnitude of the voltage of the electrical power such that the capacitance of the capacitor means decreases as the magnitude of the voltage increases, said timing means including said capacitor and said temperature responsive resistance means, said timing means reducing the selected duration of time of the toasting cycle as the magnitude of the voltage exceeds a predetermined level during the toasting cycle and reducing the selected duration of the toasting cycle as the sensed temperature in the cavity increases as a consequence of operation of the toaster for consecutive toast cycles.

2. A control for a toaster in accord with claim 1 wherein said temperature responsive resistance means is a negative temperature coefficient thermistor.

3. A control for a toaster in accord with claim 2 wherein the capacitor means is responsive to the temperature within the cavity such that the capacitance of said capacitor means changes as sensed temperature varies.

4. A control for a toaster in accord with claim 3 wherein the capacitance of the capacitor decreases as sensed temperature increases.

5. A control for a toaster in accord with claim 4 further including mounting means for locating the thermistor in the upper sidewall of the housing defining the toasting cavity.

6. A control for a toaster in accord with claim 5 wherein the mounting means includes a nonconductive plastic housing for connecting the thermistor to the wall of the toaster housing.

7. A control for a toaster in accord with claim 6 wherein the mounting means includes a generally large diameter opening adjacent the thermistor for communicating the thermistor with the interior of the toast cavity.

8. A control for a toaster in accord with claim 1 wherein the capacitor means is responsive to the temperature within the cavity such that the capacitance of the capacitor means changes as sensed temperature varies.

9. A control for a toaster in accord with claim 8 wherein the capacitance of the capacitor decreases as sensed temperature increases.

10. A control for a toaster in accord with claim 1 further including mounting means for locating the thermistor in the upper sidewall of the housing defining the toasting cavity.

11. A control for a toaster in accord with claim 10 wherein the mounting means includes a nonconductive plastic housing for connecting the thermistor to the wall of the toaster housing.

12. A method for varying the duration of time of a toasting cycle of an electric toaster comprising the steps of:
   establishing an initial toast cycle duration for obtaining a desired toast color;
   monitoring the temperature within a toasting cavity to reduce the duration of the established cycle as the temperature in the cavity increases as a consequence of operation of the toaster for consecutive toast cycles; and
   monitoring the magnitude of the voltage supply to the electric toaster to reduce the duration of the established cycle as the magnitude of the voltage exceeds a predetermined level during a toasting cycle.

13. A method in accord with claim 12 wherein the temperature monitoring step includes utilizing a temperature responsive capacitor to sense the temperature within the toasting cavity; and
   utilizing a temperature responsive resistance element to sense the temperature within the toasting cavity.

14. A method for varying the duration of the timing cycle in accord with claim 12 further including the step of utilizing a capacitor to monitor the temperature within the toasting cavity and to monitor the magnitude of the voltage supply to the electric toaster.

15. A control for a toaster for varying the duration of a toasting cycle comprising:

heating means mounted in a toasting cavity defined by a toaster housing;

means for connecting the heating means to a source of electrical power;

means for selecting a duration of time for the toasting cycle to obtain a desired toast color;

temperature responsive resistance means for sensing the temperature within the toasting cavity;

timing means for automatically varying the selected time duration of the toasting cycle including switch means for disconnecting the heating means from the source of electrical power of the toasting cycle; and temperature sensitive capacitor means electrically connected to the source of electrical power and responsive to the temperature within the toasting cavity such that the capacitance of the capacitor means decreases as the sensed temperature increases, said timing means including said capacitor and said temperature responsive resistance means, said timing means reducing the selected duration of time of the toasting cycle as the sensed temperature in the cavity increases as a consequence of operation of the toaster for consecutive toast cycles.

16. A control for a toaster in accord with claim 15 wherein said temperature responsive resistance means is a negative temperature coefficient thermistor.

17. A control for a toaster in accord with claim 16 wherein the capacitor means is additionally responsive to the magnitude of the voltage of the electrical power such that the capacitance decreases as the magnitude of the voltage increases.

* * * * *